United States Patent
Rai et al.

(10) Patent No.: US 11,192,966 B2
(45) Date of Patent: Dec. 7, 2021

(54) PROCESS FOR THE PRODUCTION OF POLYACRYLONITRILE

(71) Applicant: SABIC GLOBAL TECHNOLOGIES B.V., Bergen op Zoom (NL)

(72) Inventors: Roopali Rai, Geleen (NL); Stephen D. Pask, Geleen (NL); Susanta Mitra, Bangalore (IN); Abdulsattar Dawood, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 234 days.

(21) Appl. No.: 16/462,370

(22) PCT Filed: Nov. 28, 2017

(86) PCT No.: PCT/EP2017/080652
§ 371 (c)(1),
(2) Date: May 20, 2019

(87) PCT Pub. No.: WO2018/099909
PCT Pub. Date: Jun. 7, 2018

(65) Prior Publication Data
US 2019/0276569 A1    Sep. 12, 2019

(30) Foreign Application Priority Data
Dec. 1, 2016    (EP) .................................... 16201607

(51) Int. Cl.
*C08F 120/44* (2006.01)
*D01F 6/18* (2006.01)
*C08F 220/44* (2006.01)

(52) U.S. Cl.
CPC .......... *C08F 120/44* (2013.01); *C08F 220/44* (2013.01); *D01F 6/18* (2013.01)

(58) Field of Classification Search
CPC .................................. C08F 120/44; D01F 6/18
See application file for complete search history.

(56) References Cited

U.S. PATENT DOCUMENTS

| 4,540,754 | A | * | 9/1985 | Kobashi | .................... C08F 2/18 526/88 |
| 7,183,433 | B2 | | 2/2007 | Abbott et al. | |
| 8,822,029 | B2 | | 9/2014 | Tanaka et al. | |

FOREIGN PATENT DOCUMENTS

| CN | 101139412 A | 3/2008 |
| CN | 103467382 A | 12/2013 |

OTHER PUBLICATIONS

Carranza et al., On the stability and chemo rheology of a urea choline chloride deep-eutectic solvent as an internal phase in acrylic high internal phase emulsion, RSC Adv., (2016) 6 81694-81702 (Year: 2016).*
Carranzam A., "On the stability and chemorheology of a urea choline chloride deep-eutectic solvent as an internal phase in acrylic high internal phase emulsions", The Royal Society of Chemistry, vol. 6, 2016; pp. 81694-81702.
European Search Report for the corresponding Application No. EP16201607; dated Jan. 30, 2017; 2 pages.
Morris, A. et al., "High performance carbon fibers from very high molecular weight polyacrylonitrile precursors", Carbon, vol. 101, 2016; pp. 245-252.
Niu, S., et al., "Synthesis of High Molecular Weight and Narrow Molecular Weight Distribution Poly(acrylonitrite) via RAFT Polymerization", Journal of Polymer Science, Polymer Chemistry, vol. 51, 2013; pp. 1197-1204.
Tsai et al., "The Effect of Molecular Weight on the Cross Section and Properties of Polyacrylonitrile Precursor and Resulting Carbon Fiber", Journal of Applied Polymer Science, vol. 42, 1991; pp. 3045-3050.

\* cited by examiner

*Primary Examiner* — Robert D Harlan
(74) *Attorney, Agent, or Firm* — Cantor Colburn LLP

(57) ABSTRACT

The present invention relates to a process for the production of polyacrylonitrile by polymerisation of a reaction mixture comprising acrylonitrile in a solution where the solvent is a eutectic system comprising a quaternary ammonium compound and a hydrogen donor. Such process allows for the production of a polyacrylonitrile having a desirably high molecular weight, whilst polymerisation time is reduced, and where the solvents are environmentally benign, biodegradable and may be reused in the polymerisation process.

18 Claims, No Drawings

PROCESS FOR THE PRODUCTION OF POLYACRYLONITRILE

CROSS REFERENCE TO RELATED APPLICATIONS

This application is a 371 of International Application No. PCT/EP2017/080652, filed Nov. 28, 2017, which is incorporated by reference in its entirety, and which claims priority to European Application Serial No. 16201607.5 filed Dec. 1, 2016.

The present invention relates to a process for the production of polyacrylonitrile. The invention also relates to polyacrylonitrile produced using such process.

Polyacrylonitrile is a well-known polymer material that finds its use in amongst others the production of fibres, such as for use as reinforcing fillers or as in textile and technical fabrics. For example, homopolymers of polyacrylonitrile find their use as fibres for hot gas filtration systems, outdoor awnings, sails for yachts and in reinforcing concrete. Exemplary use of copolymers of polyacrylonitrile is in fibres to make knitted clothing such as socks and sweaters, as well as in outdoor products such as tents.

Polyacrylonitrile has certain advantageous properties. One of the advantageous properties of polyacrylonitrile is the ability to absorb metal ions. Polyacrylonitrile further has a low density, high thermal stability, high strength and high modulus of elasticity. Because of these properties, polyacrylonitrile is a desirable materials for use in high-performance applications, such as oxidized polyacrylonitrile fibres which may be further treated to make carbon fibres.

The production of polyacrylonitrile may take place via one of several processes, including for example solution polymerisation, suspension polymerisation and emulsion polymerisation.

Production of polyacrylonitrile via solution polymerisation commonly is carried out using as solvent compounds such as dimethyl formamide, dimethyl acetamide, dimethyl sulfoxide, and aqueous solutions of sodium thiocyanate or zinc chloride. Polyacrylonitrile produced using such solution polymerisation process however has a relatively low viscosity and low molecular weight as a result of chain transfer processes caused by the solvent. Furthermore, the process involves the need for a step to remove or recover the solvent after the polymerisation is concluded.

Suspension polymerisation also tends to result in a polyacrylonitrile that does not have a molecular weight that is sufficiently high for certain high-performance applications.

Emulsion polymerisation has the disadvantage that the polymer tends to contain large amounts of impurities which are difficult to separate and impair properties such as tensile properties of the fibres produced. Emulsion polymerisation processes also produce considerable amounts of waste water which requires treatment.

In view of the desire to obtain a polyacrylonitrile having a high molecular weight, such as a weight average molecular weight of more than 500000 g/mol, there is a need to develop an appropriate process. Such process is now provided by the process of the present invention.

In the context of the present invention, the molecular weight of the polyacrylonitrile is expressed by the number average molecular weight ($M_n$) and the weight average molecular weight ($M_w$).

The objective of the present invention to produce a polyacrylonitrile having a desirably high molecular weight is achieved by a process for the production of polyacrylonitrile by polymerisation of a reaction mixture comprising acrylonitrile in a solution where the solvent is a eutectic system comprising a quaternary ammonium compound and a hydrogen donor.

Such process results in a polyacrylonitrile having an exceptionally high molecular weight, for example as expressed by the weight average molecular weight, for example the polyacrylonitrile may have a weight average molecular weight of over 500000 g/mol. As a result of that, the polyacrylonitrile produced according to the process of the present invention is particularly suitable for high-performance applications.

A further advantage of the process according to the present invention is that the polymerisation of polyacrylonitrile is performed much faster than is the case with processes according to the state of the art, such as for example in solution polymerisation processes using a solvent such as dimethyl formamide, dimethyl acetamide, dimethyl sulfoxide, and aqueous solutions of sodium thiocyanate or zinc chloride, or in suspension polymerisation processes.

Yet another advantage of the process according to the present invention is that the solvent that is used is environmentally benign, biodegradable and may be reused in the polymerisation process.

In a certain embodiment of the present invention, the quaternary ammonium compound is a compound having a structure according to formula (I):

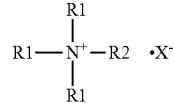

wherein:
each R1 is the same or different and is a moiety comprising 1 to 20 carbon atoms; preferably comprising 1 to 5 carbon atoms;
R2 is a moiety comprising 1 to 10 carbon atoms, preferably 1 to 5 carbon atoms, and one or more group selected from —OH, —F, —Cl, or combinations thereof; and
X is a chlorine, iodine, fluorine or bromine atom, or a moiety selected from $NO_3$ or $BF_4$.

The use of such quaternary ammonium compound is understood to contribute to a reduction of the freezing point of the eutectic system.

For example, R1 may be an ethyl, methyl, propyl, butyl or methylphenyl moiety.

In a particular quaternary ammonium compound used in the process according to the present invention, each R1 is methyl or ethyl; more preferably, each R1 is methyl.

R2 may for example be a moiety selected from $C_2H_4OH$, $C_2H_4F$, $C_2H_4Cl$, or $C_2H_4O(CO)CH_3$.

In an exemplary embodiment of the present invention, in the quaternary ammonium compound, each R1 is methyl, and R2 is $C_2H_4OH$ or $C_2H_4Cl$. Particularly, it is preferred in the present invention that in the quaternary ammonium compound, each R1 is methyl, R2 is $C_2H_4OH$ or $C_2H_4Cl$, and X is chlorine. For example, each R1 may be methyl, R2 may be $C_2H_4OH$ and X may be chlorine; alternatively, each R2 may be methyl, R2 may be $C_2H_4Cl$ and X may be chlorine. For example, each R1 may be ethyl, R2 may be $C_2H_4OH$ and X may be chlorine; alternatively, each R2 may be ethyl, R2 may be $C_2H_4Cl$ and X may be chlorine.

The quaternary ammonium compound may for example be a compound selected from 2-hydroxyethyl trimethyl ammonium chloride, 2-hydroxyethyl trimethyl ammonium bromide, 2-hydroxyethyl trimethyl ammonium tetrafluoroborate, 2-hydroxyethyl trimethyl ammonium fluoride, 2-hydroxyethyl trimethyl ammonium nitrate, tetraethyl ammonium bromide, tetraethyl ammonium chloride, tetraethyl ammonium fluoride, benzyl 2-hydroxyethyl dimethyl ammonium chloride, benzyl 2-hydroxyethyl dimethyl ammonium bromide, benzyl 2-hydroxyethyl dimethyl ammonium fluoride, ethyl 2-hydroxyethyl dimethyl ammonium chloride, ethyl 2-hydroxyethyl dimethyl ammonium bromide, ethyl 2-hydroxyethyl dimethyl ammonium fluoride, benzyl trimethyl ammonium chloride, benzyl trimethyl ammonium fluoride, benzyl trimethyl ammonium bromide, 2-chloroethyl trimethyl ammonium chloride, 2-chloroethyl trimethyl ammonium fluoride, or 2-chloroethyl trimethyl ammonium bromide.

Preferably, the quaternary ammonium compound is a compound selected from 2-hydroxyethyl trimethyl ammonium chloride or trimethylglycine hydrochloride. It is particularly preferred that the quaternary ammonium compound is 2-hydroxyethyl trimethyl ammonium chloride.

In particular embodiments of the invention, the hydrogen donor may be a compound selected from urea, 1-methyl urea, 1,1-dimethyl urea, 1,3-dimethyl urea, tetramethyl urea, thiourea, acetamide, and benzamide.

It is particularly preferred that the hydrogen donor is a compound having a structure according to formula (II):

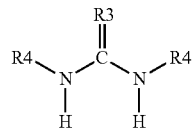

wherein:
R3 is an atom selected from oxygen or sulfur; and
each R4 is the same or different and is selected from hydrogen, methyl or ethyl.

In a preferred embodiment, each R4 is hydrogen or methyl. Even more preferably, each R4 is hydrogen. Particularly preferably, each R4 is hydrogen and R3 is oxygen.

For example, hydrogen donor may be a compound selected from urea, thiourea, 1-methyl urea, 1,1-dimethyl urea or 1,3-dimethyl urea. It is particularly preferred that the hydrogen donor is urea. This provides a particularly desirable depression of the freezing point of the eutectic mixture.

For example, the eutectic system is a composition comprising a quaternary ammonium compound and a hydrogen donor. The eutectic system may for example be a binary system. In the case where the eutectic system is a binary system, the eutectic system is a composition consisting of a quaternary ammonium compound and a hydrogen donor. Alternatively, the eutectic system may comprise further ingredients, such as for example to form a ternary system.

It is particularly preferred that the solvent is a eutectic system comprising 2-hydroxyethyl trimethyl ammonium chloride and urea. More particularly, it is preferred that the solvent is a eutectic system of 2-hydroxyethyl trimethyl ammonium chloride and urea wherein the molar ratio of 2-hydroxyethyl trimethyl ammonium chloride and urea is 1.0:2.0. Such eutectic system provides a desirable depression of the freezing point, and allows for the use of such eutectic system as solvent at room temperatures, i.e. at temperatures of for example 20-30° C. Further such eutectic system allows for the production of polyacrylonitrile by precipitation.

The use of a eutectic system of urea and chlorine chloride as solvent in the process according to the invention provides a further advantage in that the solvent is non-toxic. In fact, both urea and choline chloride are used as supplements for animal feed material. Thus, such solvent provides an opportunity to produce a polyacrylonitrile with a reduced involvement of toxic products in the process.

The eutectic system may for example be produced by heating a mixture comprising the quaternary ammonium compound and the hydrogen donor at a temperature of 80-100° C. for a duration such that a clear liquid is obtained.

In the case where the eutectic system comprises a quaternary ammonium compound and a hydrogen donor and further ingredients, such further ingredients may for example be selected from zinc chloride, tin chloride, or combinations thereof. For example, the eutectic system may be a ternary system consisting of 2-hydroxyethyl trimethyl ammonium chloride, urea and zinc chloride. The quantity of each of the ingredients in the eutectic system preferably is chosen such as to form a eutectic.

Polyacrylonitriles produced using the process according to the present invention may for example comprising polymeric units according to the formula (III):

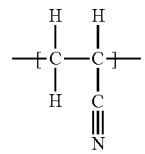

It is preferred that polyacrylonitriles produced using the process according to the present invention comprise ≥90.0 wt % of units according to formula (III) with regard to the total weight of the polyacrylonitrile. More preferably, the polyacrylonitrile produced using the process according to the present invention comprises ≥95.0 wt % of units according to formula (III), even more preferably ≥97.0 wt %, with regard to the total weight of the polyacrylonitrile.

The polyacrylonitrile may be a homopolymer of acrylonitrile.

A further advantage of the process according to the present invention is that the duration of the polymerisation process may be significantly reduced. For example, the duration of the polymerisation may be 20-60 min.

The process for the production of polyacrylonitrile according to the invention may for example involve in this order the steps of:
  a) preparation of the mixture comprising the reaction mixture and the solvent;
  b) addition of the initiator;
  c) conducting the polymerisation reaction; and
  d) separating the solvent from the polyacrylonitrile.

In a particular embodiment, the process comprises a step for removal of unreacted monomers. This step may for example be positioned between step c) and step d). It is preferred that the unreacted monomers are fed back to the preparation step a) or the polymerisation step c).

The process may further involve feeding back the solvent that is separated in step d) to the preparation step a).

The process may be operated as a batch process, such as in a batch process where the steps are conducted consecutively in a single vessel. Alternatively, the process may be operated as a continuous process, such as a continuous process where the consecutive steps are operated in different unit operations. For example, the process may comprise performing step a) in a first unit, followed by the execution of the polymerisation step c) in a further unit, and the separation d) in another further unit. Such process may be operated in a fully continuous way, where all units in the process operate continuously, or in a semi-continuous way, where one or more of the units in the process operate in a continuous way and further one or more units operate in a batch-wise manner.

The process according to the present invention may for example be conducted in a spinning disc reactor or a stirred tank reactor.

The polymerisation may for example be performed at a temperature of 50-75° C.

In the process according to the present invention, a quantity of one or more initiator may be used. For example, 10-200 ppm initiator may be used with regard to the total weight of the reaction mixture. The initiator may for example be a peroxide compound or an azonitrile compound, For example, the initiator may be a compound selected from dibenzoyl peroxide, dicumyl peroxide, methyl ethyl ketone peroxide, cumene hydroperoxide, tert.-butyloxy 2-ethyl hexanoate, dicyclohexyl peroxydicarbonate, tert-.butyl perbenzoate, tert.butyl cumyl peroxide, di-tert. butyl peroxy-3,3,5-tri methyl cyclohexane, 1,3-bis(tert.butyl)peroxyisopropyl benzene, N,N'-azobisisobutyronitrile and N,N'-azobisvaleronitrile. Mixtures of the initiators envisaged here are also suitable for use. Particularly suitable as an initiator is N,N'-azobisisobutyronitrile.

Preferably, 10-200 ppm with regard to the total weight of the reaction mixture of N,N'-azobisisobutyronitrile is used as initiator.

It is preferred that the reaction mixture comprises the acrylonitrile and optionally further monomers. For example, the reaction mixture may comprise ≤10.0 wt % of further monomers with regard to the total weight of the reaction mixture. Preferably, the reaction mixture comprises ≤3.0 wt % of further monomers with regard to the total weight of the reaction mixture. Particularly preferably, the reaction mixture comprises ≥0.5 wt % and ≤3.0 wt % of further monomers with regard to the total weight of the reaction mixture. The presence of such quantity of further monomers is understood to result in a desired balance of plasticising of the polyacrylonitrile and low degree of fusing of the polyacrylonitrile, when spun into fibres.

The further monomers may for example be selected from acrylic acid, methacrylic acid, methyl acrylate, methyl methacrylate, acrylic acid, methacrylic acid, itaconic acid, acrylamide, methacrylamide, N-methylolacrylamide, methyl vinyl ketone, hydroxyacrylonitrile, acrolein, methacrolein, methallyl sulfonic acid, styrene sulfonic acid, vinyl acetate, methyl acetate, styrene, or combinations thereof. In certain embodiments, it is preferred that the further monomers are selected from from acrylic acid, methacrylic acid, methyl acrylate, methyl methacrylate, acrylic acid, methacrylic acid, itaconic acid, or combinations whereof. A particularly preferred combination of further monomers is methyl acrylate and itaconic acid. It is particularly preferred that the reaction mixture comprises ≥0.5 wt % and ≤3.0 wt % of further monomers with regard to the total weight of the reaction mixture where the further monomers are methyl acrylate and itaconic acid.

The polyacrylonitrile produced via the process according to the present invention preferably has a weight average molecular weight of 200000 g/mol, more preferably 500000, even more preferably 1000000 g/mol. The weight average molecular weight may for example be determined in accordance with ISO 16014-1 (2012).

The polyacrylonitrile produced via the process according to the present invention may for example be used in the production of technical fibres or textile fibres. The present invention also relates to fibres produced using the polyacrylonitrile produced via the process according to the present invention.

In a particular embodiment, the present invention relates to a process for the production of polyacrylonitrile by polymerisation of a reaction mixture comprising acrylonitrile in a solution where the solvent is a eutectic system comprising a quaternary ammonium compound and a hydrogen donor, wherein the quaternary ammonium compound is 2-hydroxyethyl trimethyl ammonium chloride and the hydrogen donor is urea, wherein the molar ratio of 2-hydroxyethyl trimethyl ammonium chloride and urea is 1.0:2.0, wherein the polymerisation is performed at a temperature of 50-75° C., and wherein the duration of the polymerisation is 20-60 min.

In another particular embodiment, the present invention relates to a process for the production of polyacrylonitrile by polymerisation of a reaction mixture comprising acrylonitrile in a solution where the solvent is a eutectic system consisting of quaternary ammonium compound and a hydrogen donor, wherein the quaternary ammonium compound is 2-hydroxyethyl trimethyl ammonium chloride and the hydrogen donor is urea, wherein the molar ratio of 2-hydroxyethyl trimethyl ammonium chloride and urea is 1.0:2.0, wherein the polymerisation is performed at a temperature of 50-75° C., and wherein the duration of the polymerisation is 20-60 min.

In a further particular embodiment, the present invention relates to a polyacrylonitrile produced by polymerisation of a reaction mixture comprising acrylonitrile in a solution where the solvent is a eutectic system comprising a quaternary ammonium compound and a hydrogen donor, wherein the quaternary ammonium compound is 2-hydroxyethyl trimethyl ammonium chloride and the hydrogen donor is urea, wherein the molar ratio of 2-hydroxyethyl trimethyl ammonium chloride and urea is 1.0:2.0, wherein the polyacrylonitrile has a weight average molecular weight as determined in accordance with ISO 16014-1 (2012) of ≥500000 g/mol, more preferably ≥1000000 g/mol.

The invention will now be illustrated by the following non-limiting examples.

EXPERIMENT I—PRODUCTION OF POLYACRYLONITRILE ACCORDING TO THE PROCESS OF THE INVENTION

In a round-bottom flask having a volume of 250 ml, equipped with a condenser and a nitrogen inlet, 0.28 mol urea and 0.14 mol choline chloride were introduced in a molar ratio of 2:1 and heated to 80° C. The contents of the flask were kept at this temperature under stirring for 1 hr. A eutectic solvent was obtained.

The temperature of the eutectic solvent in the round-bottom flask was reduced to 65° C. 0.2 mol Acrylonitrile and 0.39 mol % N,N'-azobis(isobutyronitrile) with regard to the acrylonitrile were introduced into the flask. The polymerisation reaction was performed during a period of 45 minutes whilst maintaining the temperature at 65° C. The contents of the flask were kept under stirring at this temperature for another 60 minutes, upon which the contents were filtered, thereby obtaining the polyacrylonitrile (I).

EXPERIMENT II—PRODUCTION OF POLYACRYLONITRILE VIA SOLUTION POLYMERISATION (COMPARATIVE)

In a round-bottom flask having a volume of 500 ml, the polymerisation of acrylonitrile was performed using dimethyl formamide as solvent. 200 ml of dimethyl formamide was heated to 90° C., upon which 0.74 mol acrylonitrile and 0.39 mol % N,N'-azobis(isobutyronitrile) with regard to the acrylonitrile were added. The reaction was performed for a period of 5 hrs at a temperature of 90° C. under stirring. Subsequently, the reaction was stopped and the reaction mixture allowed to cool to room temperature. A yellow polymer solution was obtained. This solution was precipitated in a large amount of a water-methanol mixture, filtered and dried to a constant weight at 60° C. under vacuum. The polymer was washed with an excess of water to remove unreacted products, and finally dried to obtain the polyacrylonitrile (II).

EXPERIMENT III—PRODUCTION OF POLYACRYLONITRILE VIA SUSPENSION POLYMERISATION (COMPARATIVE)

In a round-bottom flask having a volume of 500 ml, equipped with reflux condenser, nitrogen inlet and a mechanical stirrer, 0.24 g of a suspension agent, being a mixture of polyvinyl alcohol (Mw 85000-124000, 87% hydrolysed), 1.4 mmol calcium sulphate (0.25 g) and 0.16 mmol calcium phosphate (0.05 g) were added and heated to 64° C. The flask was flushed with nitrogen, and the stirrer set to 600 rpm. After 30 min, 0.77 mol acrylonitrile and 0.39 mol % N,N'-azobis(isobutyronitrile) with regard to the acrylonitrile were added. Under stirring, the mixture was allowed to react for 4 hrs. The mixture was allowed to cool, thus terminating the polymerisation reaction. The formed polymer beads were recovered via filtration and purified by washing with a 50:50 vol % water:methanol mixture to obtain polyacrylonitrile (III)

EXPERIMENT IV—PRODUCTION OF POLYACRYLONITRILE VIA PRECIPITATION POLYMERISATION (COMPARATIVE)

In a round-bottom flask having a volume of 500 ml, 200 ml ethanol was heated to a temperature of 65° C. 0.75 mol acrylontrile and 0.39 mol % N,N'-azobis(isobutyronitrile) with regard to the acrylonitrile were added and the mixture was allowed to polymerise for 5 hrs under stirring. The obtained polymer was filtered and washed with methanol to obtain polyacrylonitrile (IV).

Characterisation

Material characteristics of the obtained polyacrylonitriles (I), (II), (Ill) and (IV) were determined using gel permeation chromatography (GPC) and differential scanning calorimetry (DSC). The GPC was performed using dimethyl formamide with 10 mM LiBr as mobile phase. A sample of the prepared polyacrylonitrile was prepared by dissolving in the mobile phase for 2 hrs at 50° C. with slow agitation. The sample injection volume was 100 μl. Concentration was 1 mg/ml. The flow rate was 1 ml/min. The run time was 30 min. As column, a PLgel 5 μm Mixed-D 300×7.5 mm column was used. A refractive index detector was used. The GPC was calibrated using monodispersed PMMA standards.

The weight average molecular weight ($M_w$), the number average molecular weight ($M_n$) and the polydispersity index (PDI) were determined using the GPC data.

The DSC analysis was performed using a TA Instruments Q1000 DSC, in the temperature range of 30° C. to 350° C. at a heating rate of 7° C./min, under a nitrogen atmosphere. The analysis was carried out in two cycles. The thermal cyclisation peak ($T_{cyc}$) of the polyacrylonitrile was determined during the second cycle.

The results of the material characterisation are presented in the table below.

| Sample | $M_n$ (g/mol) | $M_w$ (g/mol) | PDI (—) | $T_{cyc}$ (° C.) |
|---|---|---|---|---|
| I | 369705 | 1361050 | 3.7 | 302 |
| II | 20919 | 51878 | 2.5 | 280 |
| III | 14587 | 68953 | 4.7 | 258 |
| IV | 20613 | 37887 | 1.8 | 262 |

The above presented results demonstrate advantages of the process according to the present invention, in that the polyacrylonitrile has a desirably high molecular weight, whilst polymerisation time is reduced, and where the solvents are environmentally benign, biodegradable and may be reused in the polymerisation process. Further the polyacrylonitrile has a higher thermal crystallisation peak.

The invention claimed is:

1. A process for the production of polyacrylonitrile by polymerisation of a reaction mixture comprising acrylonitrile in a solution where the solvent is a eutectic system comprising a quaternary ammonium compound and a hydrogen donor.

2. The process according to claim 1, wherein the quaternary ammonium compound is a compound having a structure according to formula (I):

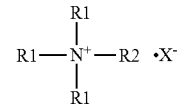

wherein:
each R1 is the same or different and is a moiety comprising 1 to 20 carbon atoms;
R2 is a moiety comprising 1 to 10 carbon atoms and one or more group selected from —OH, —F, —Cl, or combinations thereof; and
X is a chlorine, iodine, fluorine or bromine atom or a moiety selected from NO3 or BF4.

3. The process according to claim 2, wherein:
R1 is an ethyl, methyl, propyl, butyl or methylphenyl moiety;
R2 is a moiety selected from C2H4OH, C2H4F, C2H4Cl, or C2H4O(CO)CH3; and
X is a chlorine, iodine, fluorine or bromine atom.

4. The process according to claim 1, wherein the hydrogen donor is a compound having a structure according to formula (II):

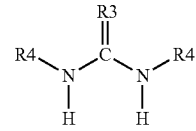

wherein:
R3 is an atom selected from oxygen or sulfur; and
each R4 is the same or different and is selected from hydrogen, methyl or ethyl.

5. The process according to claim 1, wherein the hydrogen donor is a compound selected from thiourea, 1-methyl urea, 1,1-dimethyl urea or 1,3-dimethyl urea,
and/or
wherein the quaternary ammonium compound is a compound selected from 2-hydroxyethyl trimethyl ammonium chloride, 2-hydroxyethyl trimethyl ammonium bromide, 2-hydroxyethyl trimethyl ammonium tetrafluoroborate, 2-hydroxyethyl trimethyl ammonium fluoride, 2-hydroxyethyl trimethyl ammonium nitrate, tetraethyl ammonium bromide, tetraethyl ammonium chloride, tetraethyl ammonium fluoride, benzyl 2-hydroxyethyl dimethyl ammonium chloride, benzyl 2-hydroxyethyl dimethyl ammonium bromide, benzyl 2-hydroxyethyl dimethyl ammonium fluoride, ethyl 2-hydroxyethyl dimethyl ammonium chloride, ethyl 2-hydroxyethyl dimethyl ammonium bromide, ethyl 2-hydroxyethyl dimethyl ammonium fluoride, benzyl trimethyl ammonium chloride, benzyl trimethyl ammonium fluoride, benzyl trimethyl ammonium bromide, 2-chloroethyl trimethyl ammonium chloride, 2-chloroethyl trimethyl ammonium fluoride, or 2-chloroethyl trimethyl ammonium bromide.

6. The process according to claim 1, wherein the quaternary ammonium compound is 2-hydroxyethyl trimethyl ammonium chloride and the hydrogen donor is urea.

7. The process according to claim 6, wherein the molar ratio of 2-hydroxyethyl trimethyl ammonium chloride and urea is 1.0:2.0.

8. The process according to claim 1, wherein the reaction mixture further comprises ≤10.0 wt % with regard to the total weight of the reaction mixture of a comonomer selected from acrylic acid, methacrylic acid, itaconic acid, acrylamide, methacrylamide, N-methylolacrylamide, methyl vinyl ketone, hydroxyacrylonitrile, acrolein, methacrolein, methallyl sulfonic acid, styrene sulfonic acid, vinyl acetate, methyl acetate, methyl methacrylate, styrene, or combinations thereof.

9. A process for the production of polyacrylonitrile by polymerisation of a reaction mixture comprising acrylonitrile in a solution where the solvent is a eutectic system comprising a quaternary ammonium compound, a hydrogen donor and zinc chloride or tin chloride.

10. The process according to claim 1, wherein the polymerisation is performed at a temperature of 50-75° C. and/or wherein the duration of the polymerisation is 20-60 min.

11. The process according to claim 1, wherein 10-200 ppm of an initiator is used with regard to the total weight of the reaction mixture.

12. The process according to claim 11, wherein the initiator is an azonitrile compound.

13. Polyacrylonitrile obtained according to the process of claim 1.

14. The polyacrylonitrile according to claim 13, wherein the polyacrylonitrile has a weight average molecular weight of ≥500000 g/mol.

15. Fibre produced using the polyacrylonitrile produced according to the process of claim 1.

16. The process according to claim 12, wherein the initiator is N,N'-azobis(isobutyronitrile).

17. The process according to claim 1,
wherein the quaternary ammonium compound is a compound having a structure according to formula (I):

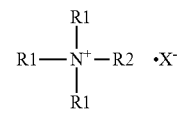

wherein:
each R1 is the same or different and is a moiety comprising 1 to 20 carbon atoms;
R2 is a moiety comprising 1 to 10 carbon atoms and one or more group selected from —OH, —F, —Cl, or combinations thereof; and
X is a chlorine, iodine, fluorine or bromine atom or a moiety selected from NO3 or BF4
wherein the hydrogen donor is a compound selected from urea, thiourea, 1-methyl urea, 1,1-dimethyl urea or 1,3-dimethyl urea,
wherein the quaternary ammonium compound is a compound selected from 2-hydroxyethyl trimethyl ammonium chloride, 2-hydroxyethyl trimethyl ammonium bromide, 2-hydroxyethyl trimethyl ammonium tetrafluoroborate, 2-hydroxyethyl trimethyl ammonium fluoride, 2-hydroxyethyl trimethyl ammonium nitrate, tetraethyl ammonium bromide, tetraethyl ammonium chloride, tetraethyl ammonium fluoride, benzyl 2-hydroxyethyl dimethyl ammonium chloride, benzyl 2-hydroxyethyl dimethyl ammonium bromide, benzyl 2-hydroxyethyl dimethyl ammonium fluoride, ethyl 2-hydroxyethyl dimethyl ammonium chloride, ethyl 2-hydroxyethyl dimethyl ammonium bromide, ethyl 2-hydroxyethyl dimethyl ammonium fluoride, benzyl trimethyl ammonium chloride, benzyl trimethyl ammonium fluoride, benzyl trimethyl ammonium bromide, 2-chloroethyl trimethyl ammonium chloride, 2-chloroethyl trimethyl ammonium fluoride, or 2-chloroethyl trimethyl ammonium bromide,
wherein the polyacrylonitrile has a weight average molecular weight of ≥500000 g/mol,
wherein 10-200 ppm of an initiator is used with regard to the total weight of the reaction mixture, and
wherein the initiator is an azonitrile compound.

18. The process according to claim 17, wherein the initiator is N,N'-azobis(isobutyronitrile).

* * * * *